United States Patent
Pemble et al.

(10) Patent No.: US 6,647,340 B1
(45) Date of Patent: Nov. 11, 2003

(54) SPACE BASED AUGMENTATION SYSTEMS AND METHODS USING IONOSPHERIC BOUNDING DATA TO DETERMINE GEOGRAPHICAL CORRECTION SOURCE

(75) Inventors: Cliff A. Pemble, Olathe, KS (US); Clayton E. Barber, Independence, MO (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 10/099,074

(22) Filed: Mar. 13, 2002

(51) Int. Cl.[7] .............................................. G01C 21/00
(52) U.S. Cl. ......................... 701/214; 701/213; 340/992
(58) Field of Search ............................... 701/214, 200, 701/213; 340/992, 988

(56) References Cited

U.S. PATENT DOCUMENTS

| | | | |
|---|---|---|---|
| 5,877,505 A | * | 3/1999 | Fujino ..................... 250/491.1 |
| 5,877,725 A | * | 3/1999 | Kalafus .................. 342/357.12 |
| 6,040,798 A | * | 3/2000 | Kinal et al. ............. 342/357.01 |
| 6,307,505 B1 | * | 10/2001 | Green .................. 342/357.09 |
| 6,347,113 B1 | * | 2/2002 | Hatch ......................... 375/149 |
| 6,452,544 B1 | * | 9/2002 | Hakala et al. .......... 342/357.13 |
| 6,469,663 B1 | * | 10/2002 | Whitehead et al. | |

* cited by examiner

Primary Examiner—Yonel Beaulieu
Assistant Examiner—Olga Hernandez
(74) Attorney, Agent, or Firm—Devon A. Rolf

(57) ABSTRACT

Systems, devices and methods are provided improving the accuracy, availability and integrity of GPS service. Specifically, the present invention provides a GPS device with the correction messages which are from the most accurate and desirable source while at the same time conserving processor and memory resources of the device. The method includes receiving GPS data. An SBAS signal from a first correction source is received. Ionospheric mask messages, for a number of grid points, in the received SBAS signal are analyzed. An abbreviated bounding region around a group of similar type grid points is constructed. The method further includes determining whether the position of the GPS device is within the abbreviated bounding region.

28 Claims, 12 Drawing Sheets

| AOR-W | BAND 0 | | | BAND 1 | | | | | | | | BAND 2 | | | | | | | | | BAND 3 | |
|---|---|---|---|---|---|---|---|---|---|---|---|---|---|---|---|---|---|---|---|---|---|---|
| | W155 | W150 | W145 | W140 | W135 | W130 | W125 | W120 | W115 | W110 | W105 | W100 | W095 | W090 | W085 | W080 | W075 | W070 | W065 | W060 | W055 | W050 |
| N75 | -- | 15 | -- | -- | -- | -- | -- | -- | -- | -- | -- | -- | -- | -- | -- | -- | -- | -- | -- | -- | -- | -- |
| N65 | -- | 8 | -- | -- | -- | -- | -- | -- | -- | -- | -- | -- | -- | -- | -- | -- | -- | -- | -- | -- | -- | -- |
| N55 | 8 | 8 | 4 | -- | 13 | 13 | 13 | 15 | 15 | 15 | 15 | 15 | 15 | 15 | 15 | 15 | 15 | 15 | -- | -- | -- | -- |
| N50 | 15 | 15 | 15 | 15 | 15 | 15 | 3 | 2 | 4 | 4 | 3 | 3 | 9 | 5 | 5 | 3 | 3 | 7 | -- | -- | -- | -- |
| N45 | -- | -- | 15 | 15 | 15 | 3 | 3 | 2 | 2 | 4 | 3 | 3 | 5 | 5 | 3 | 3 | 3 | 7 | 3 | 3 | -- | -- |
| N40 | -- | -- | -- | -- | 15 | 4 | 4 | 3 | 3 | 3 | 2 | 2 | 3 | 3 | 3 | 3 | 3 | 15 | 15 | 15 | -- | -- |
| N35 | 15 | -- | -- | -- | -- | 6 | 4 | 4 | 4 | 4 | 4 | 4 | 4 | 4 | 4 | 4 | 4 | 15 | 15 | 3 | -- | -- |
| N30 | 15 | 15 | 15 | 15 | 15 | 12 | 15 | 15 | 15 | 15 | 5 | 5 | 5 | 8 | 15 | 4 | 6 | 15 | 15 | 15 | -- | -- |
| N25 | 15 | 15 | 15 | -- | -- | 15 | 15 | 15 | 15 | 15 | 15 | 15 | 8 | 15 | 15 | 4 | 15 | 15 | 15 | 15 | -- | -- |
| N20 | 13 | 15 | -- | -- | -- | -- | -- | -- | -- | 15 | -- | -- | 15 | 15 | 15 | 15 | 15 | 15 | 15 | 15 | -- | -- |
| N15 | 15 | 15 | -- | -- | -- | -- | -- | -- | -- | -- | -- | -- | -- | 15 | -- | -- | 15 | 15 | 15 | 15 | -- | -- |
| N10 | 15 | -- | -- | -- | -- | -- | -- | -- | -- | -- | -- | -- | -- | -- | -- | -- | -- | 15 | -- | -- | -- | -- |
| N05 | -- | -- | -- | -- | -- | -- | -- | -- | -- | -- | -- | -- | -- | -- | -- | -- | -- | -- | -- | -- | -- | -- |

-- INDICATES BAND MASK WAS NOT SET FOR GRID POINT

| POR | BAND 0 | | | | | | | | BAND 1 | | | | | | | | BAND 2 | | | | |
|---|---|---|---|---|---|---|---|---|---|---|---|---|---|---|---|---|---|---|---|---|---|
| | W180 | W175 | W170 | W165 | W160 | W155 | W150 | W145 | W140 | W135 | W130 | W125 | W120 | W115 | W110 | W105 | W100 | W095 | W090 | W085 | W080 |
| N75 | -- | -- | -- | -- | 15 | -- | 15 | -- | 15 | 15 | -- | -- | -- | -- | -- | -- | -- | -- | -- | -- | -- |
| N65 | 15 | 15 | -- | -- | 8 | -- | 8 | 4 | 12 | 13 | 13 | 15 | -- | -- | -- | -- | -- | -- | -- | -- | -- |
| N55 | 15 | 15 | 15 | 4 | 6 | 8 | 8 | 15 | 9 | 13 | 13 | 3 | 15 | 15 | 15 | 15 | 15 | 15 | 15 | 15 | 15 |
| N50 | 15 | 15 | 15 | 15 | 15 | 8 | 15 | 15 | 15 | 15 | 15 | 3 | 2 | 4 | 4 | 3 | 3 | 9 | 15 | 15 | 15 |
| N45 | -- | -- | 15 | 15 | 15 | -- | -- | -- | 15 | 15 | 10 | 4 | 2 | 4 | 4 | 3 | 3 | 6 | 5 | 5 | 3 |
| N40 | -- | -- | -- | -- | -- | -- | -- | -- | 15 | 15 | 10 | 4 | 4 | 2 | 3 | 3 | 2 | 2 | 3 | 3 | 3 |
| N35 | -- | -- | 15 | 15 | 15 | 15 | 15 | -- | 15 | 15 | 6 | 4 | 4 | 4 | 4 | 3 | 4 | 4 | 4 | 3 | 3 |
| N30 | -- | -- | 15 | 15 | 13 | 13 | 15 | -- | -- | -- | 12 | 6 | 4 | 15 | 15 | 6 | 5 | 5 | 8 | 4 | 4 |
| N25 | -- | -- | 15 | 15 | 13 | 13 | 15 | 15 | -- | -- | 15 | 12 | 15 | 15 | 15 | 15 | 15 | 8 | 15 | 15 | 15 |
| N20 | -- | -- | -- | 15 | 15 | 13 | 13 | -- | -- | -- | -- | 15 | 15 | 15 | 15 | 15 | 15 | 15 | 15 | 15 | 15 |
| N15 | -- | -- | -- | -- | 15 | 15 | 15 | -- | -- | -- | -- | -- | -- | -- | -- | -- | -- | -- | -- | 15 | -- |
| N10 | -- | -- | -- | -- | -- | -- | -- | -- | -- | -- | -- | -- | -- | -- | -- | -- | -- | -- | -- | -- | -- |

-- INDICATES BAND MASK WAS NOT SET FOR GRID POINT

SPACE BASED AUGMENTATION SYSTEMS AND METHODS USING IONOSPHERIC BOUNDING DATA TO DETERMINE GEOGRAPHICAL CORRECTION SOURCE

CROSS-REFERENCE TO RELATED APPLICATIONS

This application is related to the following co-pending, commonly assigned U.S. patent applications: "Method and System for Minimizing Storage and Processing of Ionospheric Grid Point Correction Information," Ser. No. 10/382,976, and "Space Based Augmentation Systems and Methods with Hierarchy for Determining Geographical Corrections Source," Ser. No. 10/029,816, which are by the same inventors and each of which disclosure is herein incorporated by reference.

FIELD OF THE INVENTION

The present invention relates generally to Space Based Augmentation Systems (SBAS) and methods to improve the accuracy, availability, and integrity of basic Global Positioning System (GPS) service. In particular, the present invention is directed to SBAS and methods using ionospheric bounding data to determine a geographical correction source.

BACKGROUND OF THE INVENTION

The Global Positioning System (GPS) is a worldwide radio-navigation system formed from a constellation of satellites and corresponding ground stations. Currently, approximately twenty-four satellites are used in the GPS. Each satellite continually broadcasts its location in space along with the current time from an internal clock. GPS receivers are able to determine their position by receiving and analyzing signals transmitted from the satellites. Two-dimensional locations are able to be determined by analyzing signals from three satellites, and three-dimensional locations are able to be determined by analyzing signals from four or more satellites. A GPS receiver determines its location by determining its distance from the GPS satellites based on the received signals and then performing a geometric triangulation on these distance measurements. GPS will be described in more detail below.

Although the current GPS has been successful, it has several shortcomings that affect the accuracy of positioning calculations. For example, GPS satellite signals are subject to errors caused by ionospheric disturbances and satellite orbit discrepancies. Ionospheric and tropospheric refraction can slow satellite signals and cause carriers and codes to diverge. Because ionospheric disturbances vary greatly from location to location, these errors are difficult to correct with civilian-type GPS receivers. These and other errors are described in more detail below.

Differential GPS (DGPS) can improve the accuracy of position measurements. DGPS uses an extra stationary receiver at a known location as a reference point. The stationary receiver measures GPS signal error by comparing its exact, known location with the location derived from the GPS signals. The reference receiver sends timing error measurements to mobile GPS receivers that allow these GPS receivers to correct for errors and get a more accurate position measurement. DGPS assumes that the reference point and other receivers will encounter similar errors. One example of DGPS is the Radio Technical Commission for Maritime (RTCM) Services, provided by the U.S. Coast Guard, which provide DGPS correction signals.

Space Based Augmentation Systems (SBAS) have been developed to further account for the above-described errors and better improve the accuracy, availability and integrity of the GPS. Wide Area Augmentation System (WAAS) is one type of Space Based Augmentation System (SBAS) used in North America. The Federal Aviation Administration (FAA) developed and uses WAAS to aid in landing aircraft. The FAA is developing a Local Area Augmentation System (LAAS) with reference receivers located near runways to further aid in landing aircraft, particularly in zero visibility conditions. One benefit of WAAS is that it provides extended coverage both inland and offshore compared to a land-based DGPS. Another benefit of WAAS is that it does not require additional DGPS receiving equipment.

Other governments are developing SBAS. In Asia, the SBAS is referred to as the Japanese Multi-Functional Satellite Augmentation System (MSAS). In Europe, the SBAS is referred to as the Euro Geostationary Navigation Overlay Service (EGNOS). Eventually, GPS users around the world will have access to precise position data using these and other SBAS systems.

As will be described in more detail below, the WAAS is based on a network of wide area ground reference stations (WRSs) that are linked to cover a service area including the entire U.S. and some areas of Canada and Mexico. The number of WRSs is currently about twenty-five. The WRSs are precisely surveyed so that the exact location of each WRS is known. Signals from GPS satellites are received and analyzed by the WRSs to determine errors in the signals, including errors caused by the ionospheric disturbances described above. Each WRS in the network relays its data to a wide area master station (WMS) where correction information is computed. The WMS calculates correction messages for each GPS satellite based on correction algorithms and assesses the overall integrity of the system. The correction messages are then uplinked to Geostationary Communication Satellites (GEOs), also referred to herein as SBAS satellites or more particularly as WAAS satellites, via a ground uplink system (GUS). The SBAS satellites broadcast the messages to GPS receivers within the coverage area of the SBAS satellites on the same frequency as the GPS signals (i.e., L1, 1575.42 MHz). GPS receivers with SBAS capabilities are capable of using the correction messages to correct for GPS satellite signal errors caused by ionospheric disturbances and other inaccuracies. The SBAS satellites also act as additional navigation satellites for the GPS receivers, thus, providing additional navigation signals for position determination.

With respect to WAAS, the correction messages currently are uplinked to two WAAS satellites. The GPS receiver is capable of being positioned within the coverage area of both of these WAAS satellites such that the receiver is capable of receiving WAAS correction messages from either of these WAAS satellites. Additional GEOs are capable of being used for a more comprehensive SBAS that provides a larger coverage and more redundancy. As such, a GPS receiver is capable of being positioned within the coverage area of two or more of these SBAS satellites such that the receiver is capable of receiving SBAS correction messages from any one of these SBAS satellites.

The accuracy, desirability and/or equivalency of SBAS correction messages are not necessarily the same for the various SBAS correction sources, e.g. SBAS satellites. Accordingly, there exists a need for an improved method and system for determining the appropriate or desired geographical correction source for SBAS corrections. There is further a need for improved systems and methods which benefit from the SBAS data while utilizing a minimal amount of memory and processor resources, particularly in the GPS device.

SUMMARY OF THE INVENTION

The above mentioned problems with the accuracy, availability and integrity of GPS service, as well as other concerns for system resources, are addressed by the present invention and will be understood by reading and studying the following specification. SBAS and methods are provided for improving the accuracy, availability and integrity of GPS service. Specifically, the present invention provides a GPS device with the correction messages which are from the most accurate and desirable source while at the same time conserving processor and memory resources of the device.

In one embodiment of the present invention, a method for determining a corrections source in a space based augmentation system (SBAS) for use by a global positioning system (GPS) device is provided. The method includes receiving GPS data and receiving an SBAS signal from a first correction source. The SBAS signal contains a number of ionospheric mask messages. Each ionospheric mask message includes a number of ionospheric mask bits with each bit representing a single grid point in a single ionospheric band. The ionospheric mask messages are analyzed and an abbreviated bounding region around a group of similar type grid points is constructed.

In another embodiment of the present invention, a method for determining a corrections source in a space based augmentation system (SBAS) is provided. The method includes receiving ionospheric mask messages from a first GEO satellite. The ionospheric mask messages are dynamically analyzed to determine a first abbreviated bounding region for a group of ionospheric grid points. A position of a GPS receiver device is determined. The method further includes determining whether the position of the GPS receiver device is within the first abbreviated bounding region.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIGS. 7A and 7B are charts illustrating a collection of mask message data points spread across a number of bands, such as the bands shown in FIG. 6, as received from two differently positioned SBAS satellites;

DETAILED DESCRIPTION OF THE INVENTION

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

Figure 1:
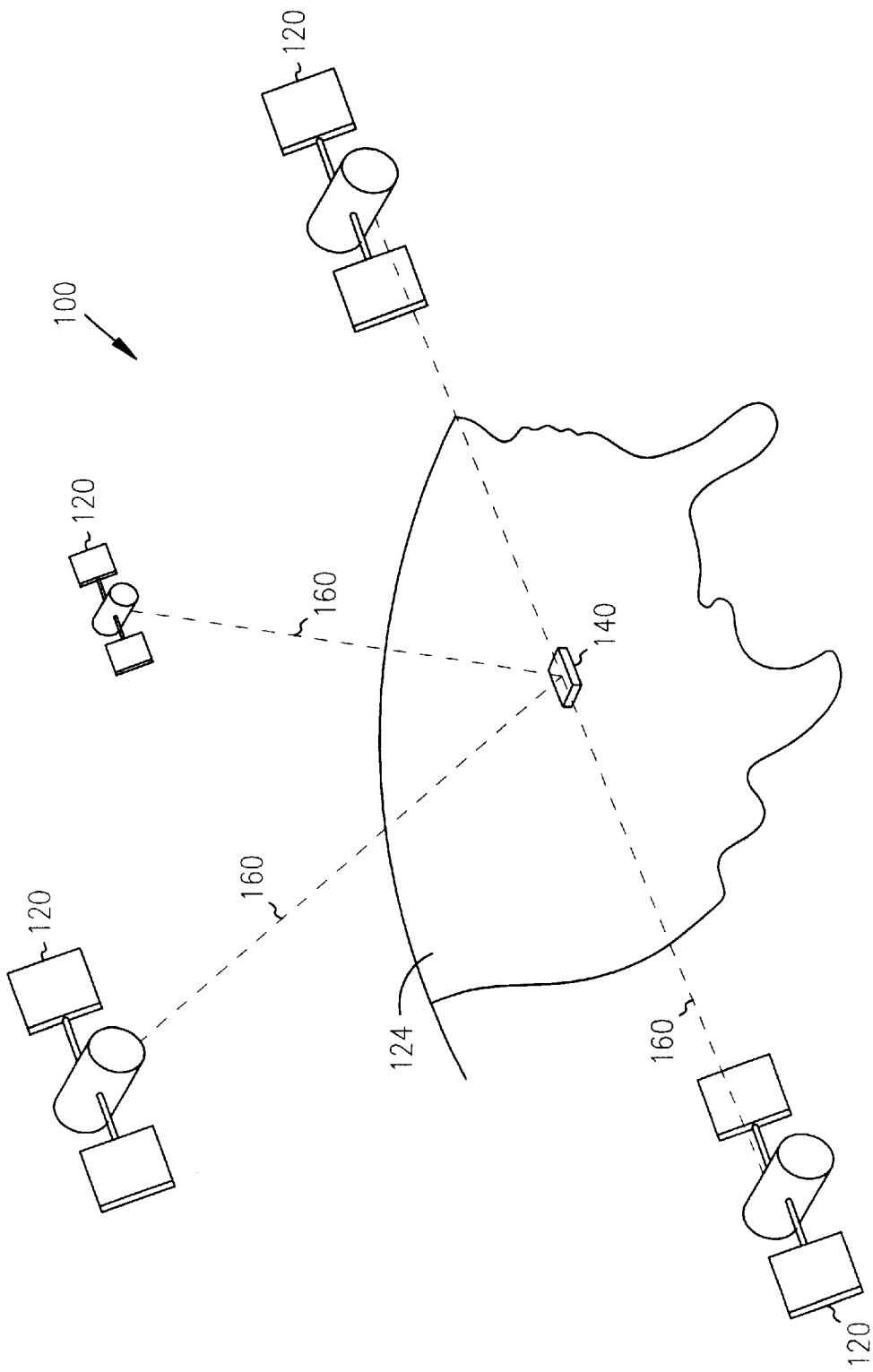
FIG. 1 is a representative view of a Global Positioning System (GPS)

FIG. 1 is a representative of a global positioning system (GPS). The GPS 100 includes a plurality of satellites 120 and a GPS receiver device 140. The plurality of satellites 120 are in orbit about the Earth 124. The orbit of each satellite 120 is not necessarily synchronous with the orbits of other satellites 120 and, in fact, is likely asynchronous. The GPS receiver device 140 of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

Currently, the constellation of GPS satellites 120 includes twenty-four GPS satellites, twenty-one of which are active and three of which are operating spares. The satellites 120 are in a high orbit about 12,000 miles above the Earth's surface. The satellites 120 are arranged in their orbits such that the GPS receiver 140 on Earth is capable of receiving signals from at least four GPS satellites 120 at any given time, if the signals are not otherwise blocked by buildings and the like. The satellites are traveling at speeds of about 7,000 miles an hour, so as to circle the earth once every twelve hours. They have small rocket boosters to keep them flying in the correct path.

Each GPS satellite 120 uses several frequencies (designated L1, L2, etc.) to continually broadcast the location of the satellite 120 in space along with the current time from an internal clock. Civilian GPS receivers 140 use the L1 frequency of 1575.42 MHz in the UHF band. The signals 160 travel in a "line of sight" (LOS); that is, the signal will pass through clouds, glass and plastic, but will not go through most solid objects such as buildings and mountains. The satellite signals 160 are very low power signals, on the order of 10 to 50 watts.

L1 contains two "pseudorandom" signals, each of which are a complex pattern of digital code. The transmitted code is referred to as a pseudorandom code because it looks like a noise signal. The code transmitted by each satellite is unique, such that the GPS receiver 140 is capable of identifying the GPS satellites 120 that transmit the pseudorandom signals. The message transmitted from the satellites to a receiver 140 contains the satellite orbital and clock information, general system status messages and an ionospheric delay model. The satellite signals are timed using highly accurate atomic clocks. These coded signals are used to calculate the travel time from the satellite to the GPS receiver on the Earth. This travel time is also called the Time of Arrival. Multiplying the travel time by the speed of light (less any delay as the signal travels through the atmosphere) provides the satellite range; i.e. the distance from the satellite to the GPS receiver.

GPS receivers 140 are able to determine their position by receiving and analyzing signals 160 transmitted from the satellites 120. The GPS receiver 140 has to know the location of the satellites 120, and the distance between the satellites 120 and the receiver 140. To determine its location, a GPS receiver 140 scans for satellite signals 160 until it has acquired signals 160 from three or more satellites. Two-dimensional locations are able to be determined by analyzing signals 160 from three satellites 120, and three-dimensional locations are able to be determined by analyzing signals 160 from four or more satellites 120.

The GPS receiver 140 knows where the satellites 120 are located in space by identifying two types of coded information from the pseudorandom satellite signals 160. One type of information is called "almanac" data. Another type of information contained in the pseudorandom satellite signals is called "ephemeris" data.

Almanac data contains the approximate positions or locations of the satellites, and is continuously transmitted as coded information by the satellite and stored in the memory of the GPS receiver 140. Thus, the GPS receiver 140 knows the orbits of the satellites and the location where each satellite is supposed to be. The almanac data is periodically updated with new information.

Ephemeris data is corrected orbital data. The GPS satellites are capable of traveling slightly out of orbit. Ground monitor stations track the orbits, altitude, location and speed of the GPS satellites. The ground stations send the orbital data to the GPS master control station, which in turn sends corrected data up to the satellites. Ephemeris data is only sent every four to six hours.

The GPS receiver 140 determines its location by determining its distance from the GPS satellites 120 based on the received signals and then triangulating these distance measurements. The satellite 120 and the GPS receiver 140 generate the same code, and the receiver 140 compares the code that it generates against the code generated by the GPS satellite 120. The signal delay or shift needed for the code of the GPS receiver 140 to the code of the GPS satellite 120 represents the time required for the signal to propagate from the GPS satellite 120 to the GPS receiver 140. The distance, or range, from the GPS receiver 140 to the GPS satellite 120 is capable of being derived from this time. This distance calculation is repeated for at least three satellites in order to determine a two-dimensional position and for at least four satellites in order to determine a three-dimensional location.

It is noted that the clock in the GPS receiver 140 is not an atomic clock, and as such does not keep the time as precisely as the clocks of the satellites 120. Therefore, each distance measurement is corrected to account for the clock error in the GPS receiver 140. This distance or range correction attributable to the clock error is termed a pseudo range.

Although the current GPS has been successful, it has several shortcomings. For example, GPS satellite signals are subject to errors caused by ionospheric disturbances and satellite orbit discrepancies. Ionospheric and tropospheric refraction can slow satellite signals and cause carrier signals and codes to diverge. Because ionospheric disturbances vary greatly from location to location, these errors are difficult to correct with civilian-type GPS receivers.

For example, the position errors of civilian GPS receivers are due to the accumulated errors of one or more of the following sources. One error source is ionosphere and troposphere delays. The satellite signal slows as it passes through the atmosphere. In one embodiment, GPS uses a built-in "model" that calculates an average, but not an exact amount of delay. In some embodiments ionosphere model parameters are sent in GPS data.

Another error source is signal multi-path, which occurs when the GPS signal reflects off objects such as tall buildings and large rock surfaces before reaching the receiver. The reflection increases the travel time of the signal.

Another error source is receiver clock errors caused by slight timing errors in the built-in clock in the receiver. This error is corrected by determining pseudorange corrections.

Another error source is orbital errors, also known as ephemeris errors, which are inaccuracies of the satellite's reported location. As stated earlier, GPS determines ephemeris errors about every four to six hours. The GPS satellite sends ephemeris data along with the almanac data to the GPS receiver. However, this ephemeris data may be four to six hours old when received by the GPS receiver.

Another error involves the number of visible satellites. The accuracy of the receiver is better when the receiver is able to "see" more satellites, i.e. is able to receive more satellite signals. However, buildings, underground and underwater areas, terrain, electronic interference, and the like, are able to block signal reception.

Another error source involves satellite geometry, or shading, which refers to the relative position of the satellites at any given time. Ideal satellite geometry exists when the satellites are located at wide angles relative to each other. Poor geometry results when the satellites are located in a line or in a tight grouping.

Another error source, which occurred until the year 2000, is the United States military's intentional degradation of the GPS signal. Up to that time, this intentional degradation, also known as Selective Availability (SA), accounted for the majority of the error in the range.

Figure 2:
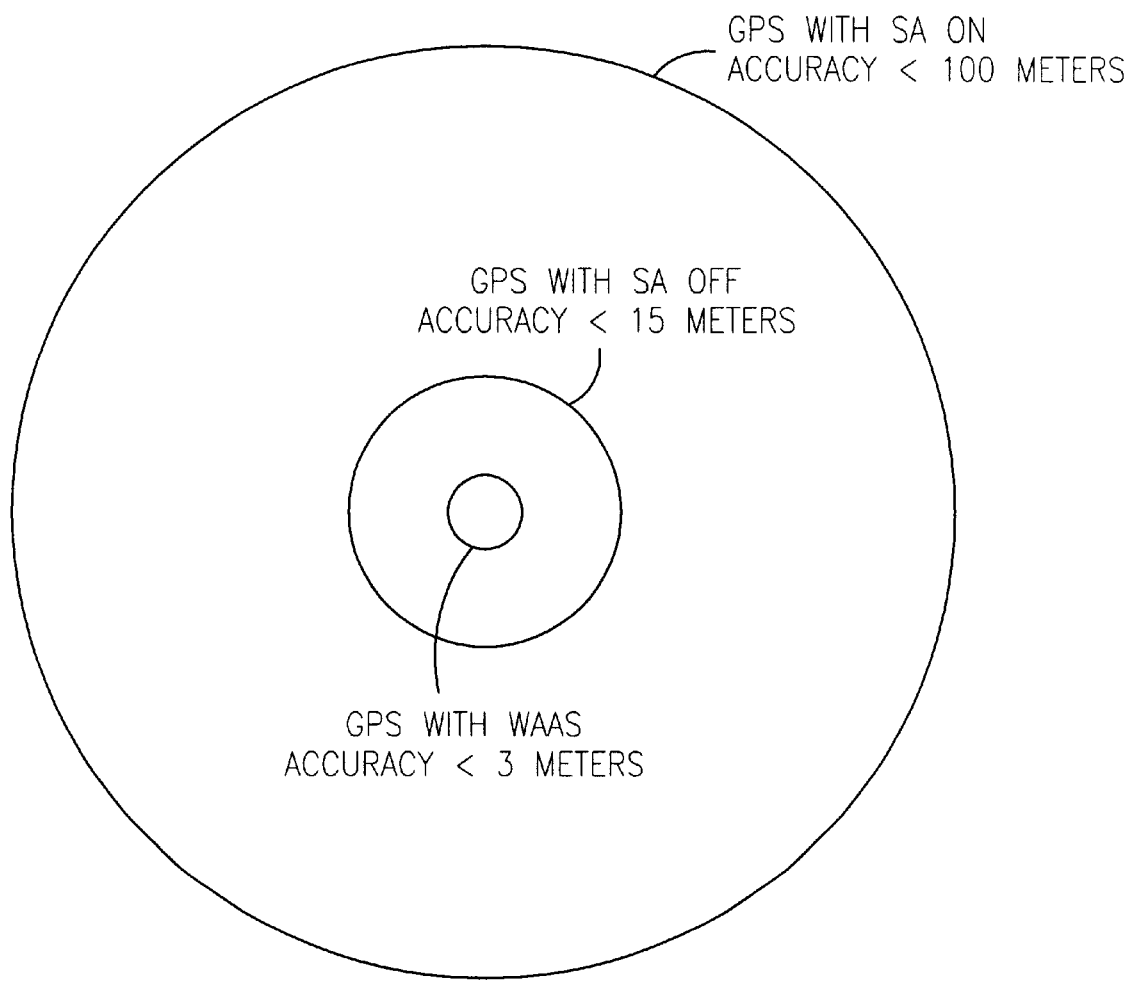
FIG. 2 is a chart plotting the progressiveness of GPS accuracy.

FIG. 2 is a chart plotting the progressiveness of GPS accuracy. According to this chart, GPS accuracy prior to the year 2000, when SA was operating, was within about 100 meters. GPS accuracy after SA was turned off improved dramatically to within about 15 meters. SBAS, such as WAAS, has been developed to accurately account for the above-described errors and improve the accuracy, availability and integrity of the GPS even further. As such, GPS with WAAS accuracy is within about 3 meters.

Figure 3:
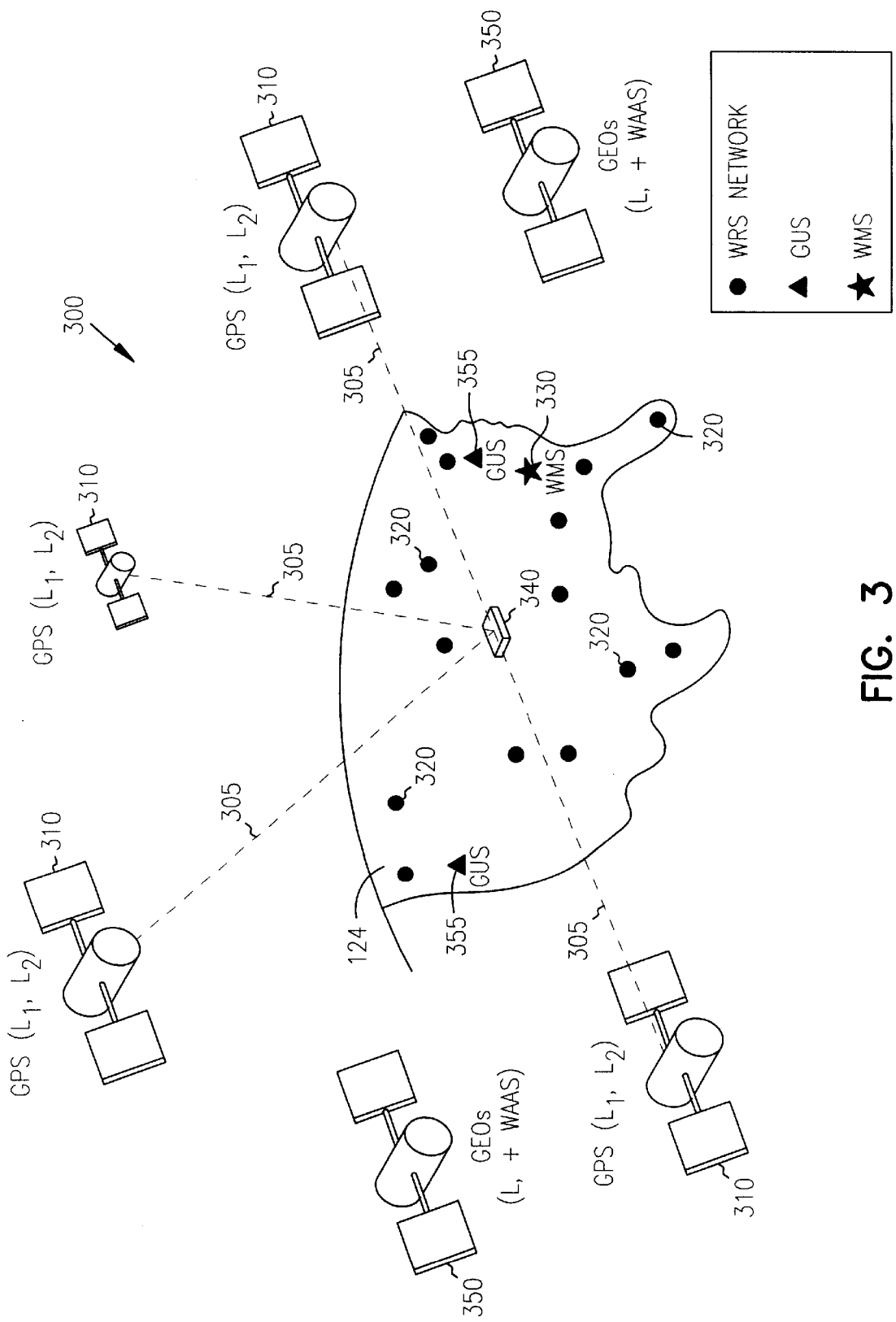
FIG. 3 is a representative view of a GPS with a Space Based Augmentation System (SBAS), particularly with a Wide Area Augmentation System (WAAS) used in North America.

FIG. 3 is a graph illustrating a conventional WAAS 300. As shown in FIG. 3, signals 305 from GPS satellites 310 (shown as 120 in FIG. 1) are received by GPS receivers 340 and additionally analyzed by the WRSs 320 to determine errors in the signals, including errors caused by the ionospheric disturbances described above. Each WRS 320 in the network relays its data to a wide area master station (WMS) 330 where correction information is computed. The WMS 330 calculates correction messages for each GPS satellite based on correction algorithms and assesses the overall integrity of the system. The correction messages are then uplinked to a number of Geostationary Communication Satellites (GEOs) 350 via a ground uplink system (GUS) 355. The GEOs 350 then broadcast the messages on the same frequency as GPS (L1, 1575.42 MHz) to GPS receivers 340 (shown as 140 in FIG. 1) within the coverage area of the WAAS. GPS receivers may then utilize the WAAS correction data to correct for GPS satellite signal errors caused by ionospheric disturbances and other inaccuracies. The GEOs also act as additional navigation satellites for the GPS receivers, thus, providing additional navigation signals for position determination.

Figure 4:
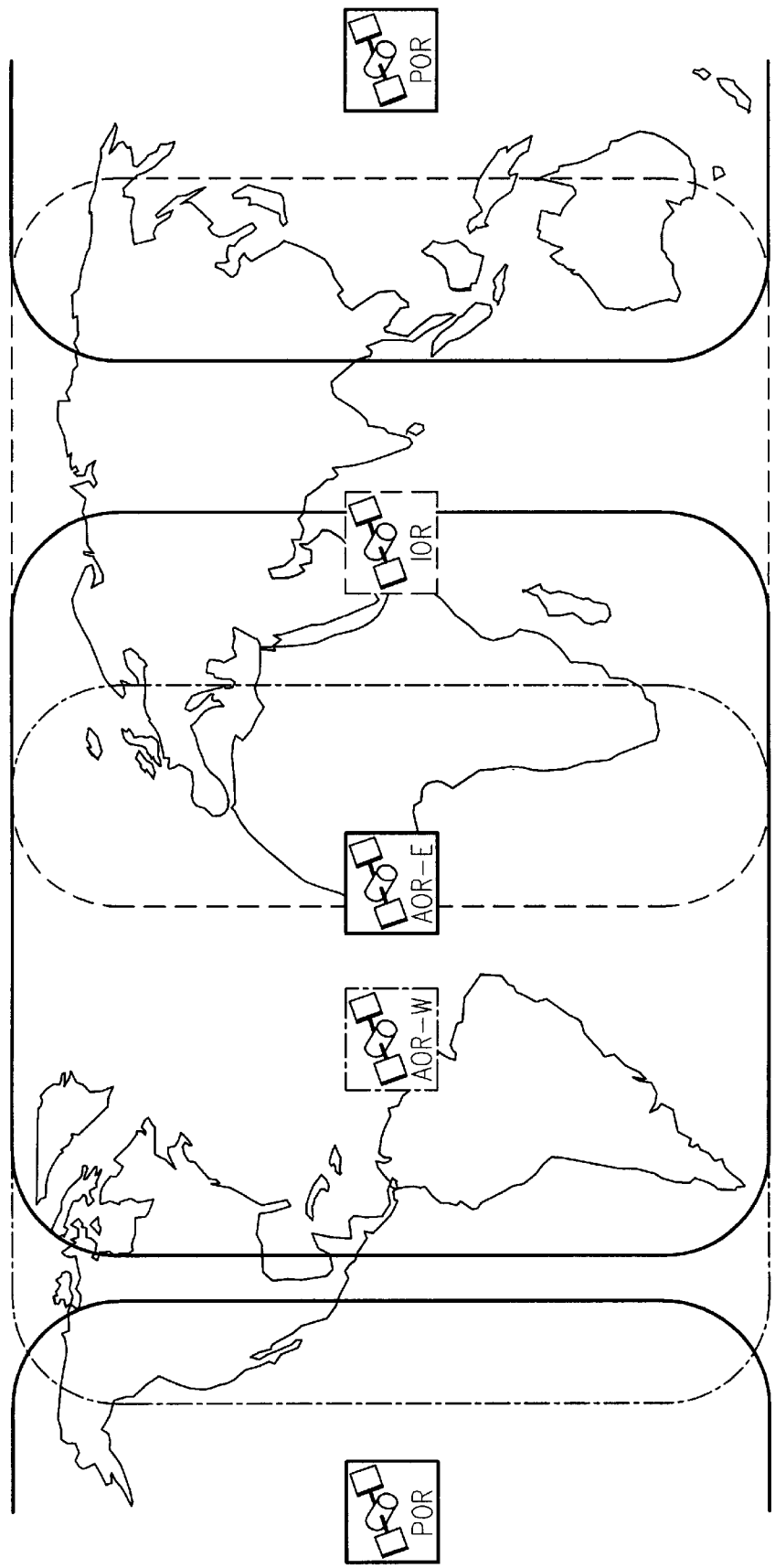
FIG. 4 is a representative view of Geostationary Communication Satellites (GEOs) and their overlapping coverage area.

FIG. 4 is a representative view of Geostationary Communication Satellites (GEOs) and their overlapping coverage area. GEOs are capable of being used as SBAS satellites, such as WAAS satellites, EGNOS satellites and MSAS satellites for example. The coverage area for these SBAS satellites overlap. In a WAAS system, for example, portions of the United States are covered by both the POR satellite and the AOR-W satellite. The illustrated AOR-E satellite and IOR satellite, which may be used in EGNOS, MSAS or other SBAS, also share coverage areas with other SBAS satellites. If and/or when they become available, other SBAS satellites may be used to provide redundancy in the signal coverage.

Due to the overlapping coverage area, the GPS receiver device often will be able to receive SBAS correction signals from more than one SBAS satellite. The corrections contained within these signals can and often will vary. A choice is made as to which SBAS satellite should be used as the geographical correction source.

As stated above, FIG. 4 illustrates that the GEOs coverage in either the North American WAAS, the European EGNOS, or the Asian MSAS may overlap. As shown in FIG. 4 an area of coverage exists over the Eastern half of the United States by AOR-E. GEO coverage in the North American WAAS is provided by AOR-W and POR. Coverage is provided in Europe by AOR-E. Thus, some of the correction transmission signals from AOR-E and AOR-W overlap for the Eastern half of the United States, but only AOR-W correction signals are applicable for or suited to positions in the United States. A first area of coverage in the WAAS is provided for all of the United States (excluding Alaska and Hawaii) by AOR-W. Some coverage by AOR-W in the Western half of the United States overlaps with coverage provided by POR. Some of the correction transmission signals from POR are better suited to the Western half of the United States than those received from AOR-W.

It has been discovered that, in order to realize the improved precision which SBAS is designed to provide in the United States, it is necessary to listen to the correction transmission signals provided by AOR-W even though correction transmission signals can be received form AOR-E. The reason for this is that correction transmission signal data is geographically oriented. To explain, the SBAS satellites broadcast several types of correction messages. The information in these messages is dependent upon the positions of the ground stations (WRSs) that make up the SBAS ground network. In order to ensure a GPS/SBAS receiver uses the best set of corrections, it is desirable to obtain information only from an SBAS satellite that is broadcasting corrections that include the GPS/SBAS receiver's present position. For example, a GPS/SBAS receiver located on the East Coast of the United States is able to receive corrections from the SBAS satellites for both the United States WAAS (i.e. AOR-W) and the European EGNOS (i.e. AOR-E). However, the EGNOS fast and long-term corrections are not well correlated to the United States East Coast because the EGNOS ground stations are located in Europe and the corrections they broadcast would limit their applicability to GPS satellites visible to both Europe and the United States (i.e. mainly satellites over the Atlantic Ocean). A GPS/SBAS receiver located on the United States East Coast could also acquire GPS satellites over the Central United States, yet could not include these satellites in a differentially corrected position when using EGNOS as the correction source. This results in a differentially corrected position that is skewed toward the commonly visible satellites. Furthermore, none of the EGNOS ionospheric corrections would be applicable to a GPS/SBAS receiver located on the United States East Coast due to the position of the EGNOS ground stations. Consequently, the differentially corrected position would not be able to reduce what is presently the largest source of error in the GPS service (since Selective Availability has been removed). Hence, it is desirable to obtain information only from the satellite that is the best source of corrections for the GPS/SBAS receiver's position.

To a lesser extent, this is also a problem within the WAAS in the United States, as there are currently two satellites providing varying scopes of coverage, e.g. AOR-W and POR. An early assumption was that because these systems share a common master control (WMS), they would both broadcast the same information. However, this is not the case. In other words, AOR-W broadcasts information which is better suited for the Eastern part of the United States, and POR broadcasts information better suited for the Western part of the United States. That is, for a GPS receiver located in the Western part of the United States, there can be some instances in which the correction data received from the POR is better suited to the GPS receiver's location than correction data received from the AOR-W. The GEO satellites themselves do not provide any guidance in terms of which satellite is the preferred correction source satellite for a given area.

Another problem, aside from simply listening to the correct satellite, is the shear volume of transmission correction data. As mentioned above, one type of information that is included in the correction messages from the GEOs is ionospheric correction data. The SBAS satellites broadcast ionospheric grid point corrections in bands representing up to 201 points each. The grid points are generally spaced at 5-degree intervals in both latitude and longitude. The positions of the grid points can be determined from the ionospheric grid point mask messages broadcast by a SBAS satellite. One approach is to store the correction points in a two dimensional array containing a total of 2,592 elements [(360 degrees longitude divided by 5 degrees) times (180 degrees latitude divided by 5 degrees)]. Many GPS receivers, including, for example, GPS receivers used in avionics applications and portable GPS receivers used for recreational and sport applications have limited memory and processing power and therefore cannot quickly and efficiently store and process all 2,592 ionospheric grid point correction elements. This problem is addressed by the applicant's co-pending and commonly assigned U.S. patent application, "Method and System for Minimizing Storage and Processing of Ionospheric Grid Point Correction Information," Ser. No. 10/382,976. This problem is compounded if a given receiver is taking corrections from more than one satellite in an area where the GEO's coverage overlaps.

Even for GPS receivers that have sufficient memory to store all the ionospheric grid point correction data in areas where the SBAS signal coverage overlaps, much of the memory required to do so is wasted because, as described above, only the ionospheric grid point correction elements provided by a correction source within a certain distance of a GPS receiver's current location are relevant or accurate enough to improve the precision of the GPS service by providing true ionospheric condition corrections, or other correction data, at that location. That is, the WRSs that are located in the Eastern part of the United States provide the best correction data for GPS receivers in the East and this correction data is only uplinked via a GUS to AOR-W.

The present invention provides an improved SBAS and method which allow a given GPS receiver to correctly identify and selectively receive those transmission correction signals which are better suited to the GPS receiver's given geographical area. In other words, the present invention allows the GPS receiver to select the best correction source SBAS satellite. Moreover, the improved SBAS and method of the present invention benefits from the SBAS data from the best correction source SBAS satellite while utilizing a minimal amount of memory and system resources.

The present invention may be implemented with and/or incorporated into any type of GPS device, including portable, handheld GPS navigation units, GPS-enabled wireless telephones, GPS-enabled personal digital assistants, GPS-enabled laptop computers, avionics equipment that incorporates GPS receivers, marine equipment that incorporates GPS receivers, and the like.

Figure 5:
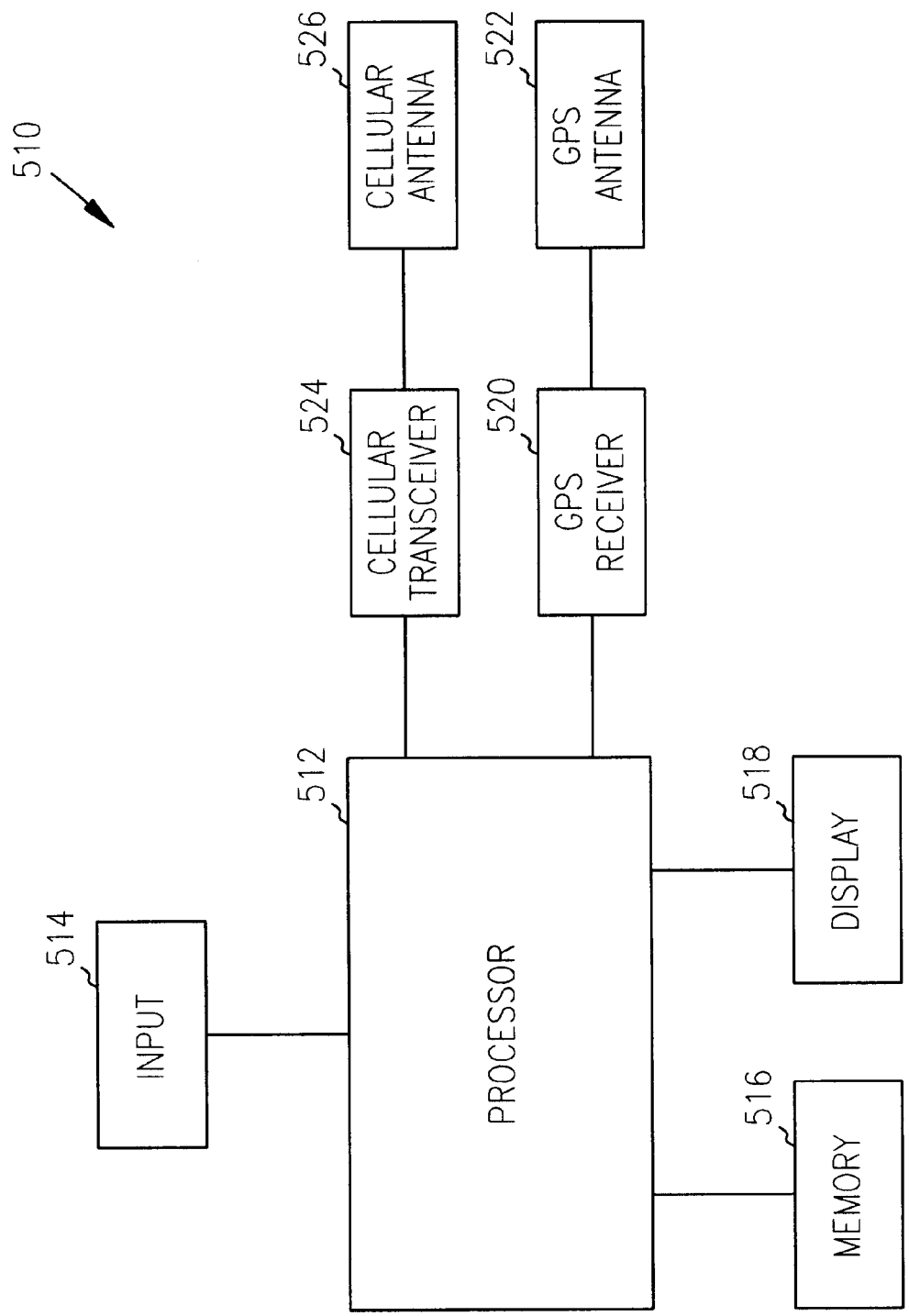
FIG. 5 illustrates an example of a suitable GPS device for implementing the present invention.

FIG. 5 illustrates an example of a suitable GPS device 510 for implementing the present invention. The GPS device 510 illustrated and described herein is only one example of a suitable device or environment and is not intended to suggest any limitation as to the scope of use or functionality of the present invention. Neither should the GPS device 510 be interpreted as having any dependency or requirement relating to any one or a combination of components illustrated in this exemplary GPS device 510.

As shown in FIG. 5, one embodiment of the GPS device 510 includes a processor 512 coupled with an input device 514, memory 516, and a display 518. The processor is further coupled with a GPS receiver 520 that is in turn coupled with a GPS antenna 522. The processor 512 may also be coupled with a cellular phone transceiver 524 and corresponding antenna 526. It will be understood that the input may be any type of input, such as a keypad, switches, touch screen, voice-input (such as a microphone), mouse or joystick, etc.

The present invention may also be described in the context of computer-executable instructions, such as program modules, being executed by a computer. Generally, program modules include routines, programs, objects, components, data structures, etc. that perform particular tasks or implement particular abstract data types.

Processor 512 typically accesses at least some. form of computer-readable media. Computer-readable media may be any available media that is accessible by the GPS system. By way of example and not limitation, computer-readable media may comprise computer storage media and communications media. Computer storage media includes volatile and non-volatile, removable and non-removable media implemented in any method or technology for storage of information such as computer-readable instructions, data structures, program modules or other data. Communication media specifically embodies computer-readable instructions, data structures, program modules or other data in a modulated data signal such as a carrier wave or transport mechanism and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, RF, infrared and other wireless media. Combinations of any of the above would also be included within the scope of computer-readable media.

As described above, a Space Based Augmentation System (SBAS) can be implemented to improve GPS accuracy, availability and integrity. A Wide Area Augmentation System (WAAS), which is one version of a Space Based Augmentation System (SBAS) has been implemented in the United States to achieve the same. Some portions of this application may refer to WAAS for ease of reference and by way of example. However, one of ordinary skill in the art will understand upon reading this disclosure that the present invention is not limited to any single one or set combination of SBAS.

In the United States WAAS data is transmitted at the same frequency as GPS signals so that GPS receivers including the GPS device 510 may receive WAAS correction messages along with GPS satellite signals. However, the present invention is not limited to this particular United States implementation.

Figure 6:
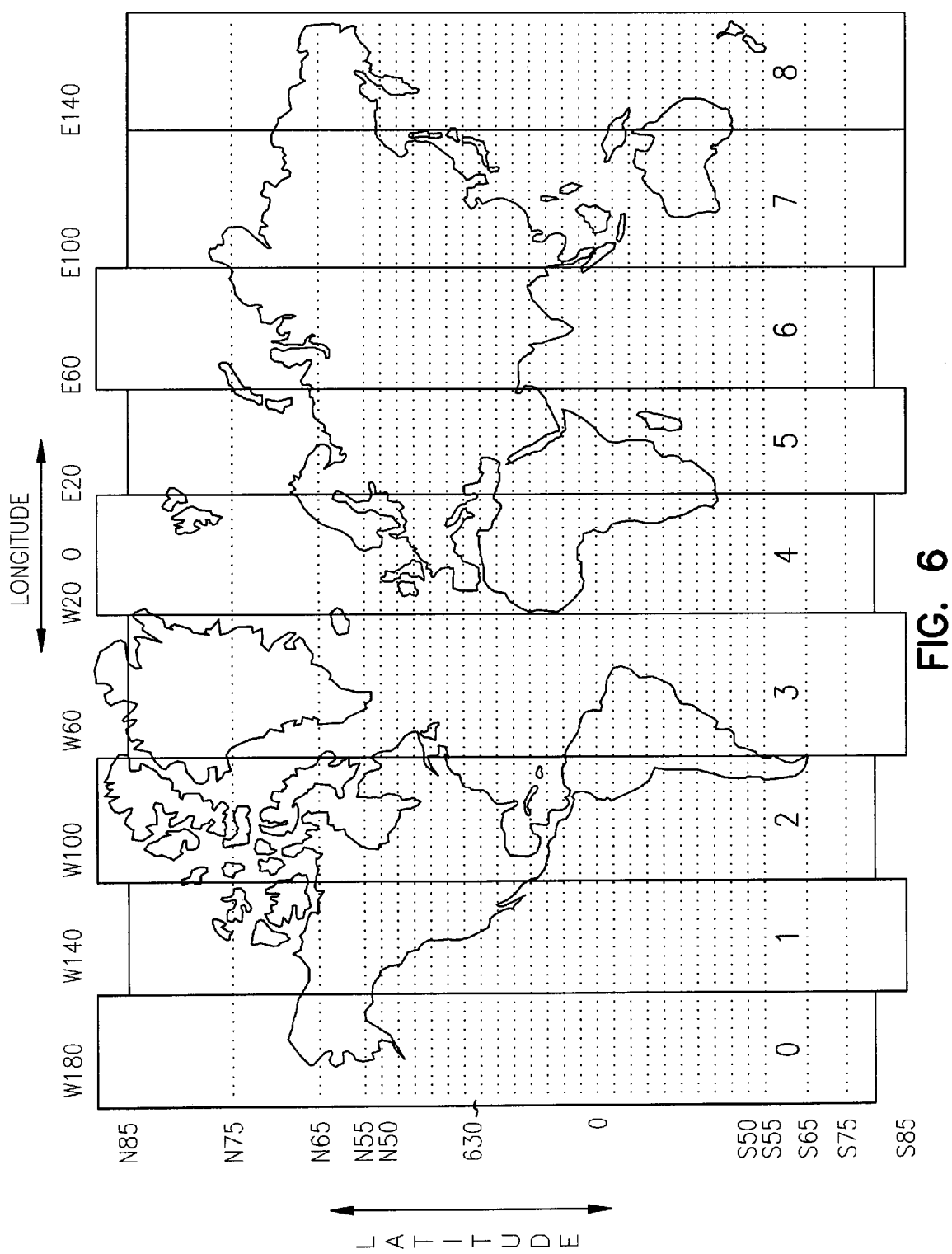
FIG. 6 illustrates a map of WAAS ionospheric grid points for which ionospheric correction data may be transmitted.

One set of data included in a WAAS correction message is ionospheric correction data. FIG. 6 illustrates a map of WAAS ionospheric grid points for which ionospheric correction data may be transmitted. Generally, each grid point 630 is spaced at five degree intervals in both longitude and latitude directions. However, upon approach to the poles of the earth, the grid points become spaced apart at 10, 30, and up to 90 degree intervals. The WAAS satellites broadcast signals containing a data structure for a mask message (Type 18) and a data structure for a delay correction message (Type 26), if any, for an area or a number of ionospheric grid points. The mask messages define the ionospheric grid point locations and indicate whether a delay correction message is being provided. The WAAS ionospheric grid points are divided into 11 bands numbered from 0 to 10 that allow for efficient broadcasting of correction messages. Each of the bands 0 through 8 illustrated in FIG. 6 covers 40 degrees of longitude. Bands 9 and 10 (not shown) are horizontal bands that cover 25 degrees of latitude and 360 degrees of longitude. In operation, the GPS receiver will receive a transmission from only one band for a particular grid point.

Restated, each SBAS satellite broadcasts ionospheric grid point mask messages (Message Type 18) representing a particular band of the earth. These messages contain information about the number of bands being broadcast by the SBAS satellite, the band number that the received message represents, an issue of data indicator, and a mask representing up to 201 grid points. Each of the mask grid points has an assigned latitude and longitude known to the receiver. The same is described in greater detail in connection with FIG. 9.

The WAAS system and its operation are described in more detail in several versions of documents entitled; "Wide Area Augmentation System (WAAS)," FAA-E-2892B, Change 2, and "Minimum Operational Performance Standards for Global Positioning System/Wide Area Augmentation System Airborne Equipment," RTCA/DO-229, 229A, 229B, and 229C. These documents are incorporated in the present application by specific reference.

FIG. 7A is a chart illustrating a collection of Grid Ionospheric Vertical Error Indicator (GIVEI) data collected from the ionospheric mask and delay correction messages spread across a number of bands, such as the bands shown in FIG. 6. As mentioned above, the mask messages define the ionospheric grid point locations and indicate whether a delay correction message is being provided. FIG. 7B is a chart illustrating another collection of GIVEI data spread across a number of bands, such as the bands shown in FIG. 6. FIGS. 7A and 7B are representative samples which vary over time. FIGS. 7A and 7B are provided for comparison of the collection of mask message data received, at a particular point in time, from the AOR-W GEO and the POR GEO, respectively, shown earlier in FIG. 4. As seen from FIGS. 7A and 7B, the transmission signals received from AOR-W and POR contain signals for ionospheric mask message data and ionospheric correction message data for overlapping grid point band regions. However, as explained above, this does not mean that the correction message data received from each SBAS satellite in those overlapping grid point band regions is equivalent.

In FIGS. 7A and 7B, the double hash mark (—) indicates that delay correction message data was not sent for that particular grid point within the bands shown in FIG. 6. As stated earlier, each grid point within the bands is assigned a latitudinal and a longitudinal coordinate. Thus, each grid point within a mask message has an assigned latitude and longitude known to the GPS receiver and stored as constants in the memory of the GPS device.

In one embodiment of the present invention, the mask message indicates whether or not delay correction message data is being sent for a particular grid point by setting a particular mask message bit to a one (1) or zero (0). In the embodiments of FIGS. 7A and 7B, numbers are shown at some grid point locations reflecting that this particular mask message bit is currently set at one (1). The numbers shown at these grid point locations in FIGS. 7A and 7B are associated with the correction message data. Double hash marks (—) are also shown at some grid point locations in FIGS. 7A and 7B indicating that this particular mask message bit is currently set at zero (0).

In FIGS. 7A and 7B, the grid points which have a bit set to one (1) in the mask message data, indicating a delay correction message is being sent, appear in obscure groupings or collections at any given point in time based on the mask message signal received from a given SBAS. As shown in FIGS. 7A and 7B, a given grouping or collection of grid points which have the above described mask message bit set to one (1) have a definable, albeit irregular, boundary which may be spread across one or more bands. Again, the collections of mask message data shown in FIGS. 7A and 7B are a snapshot in time. Thus, the boundaries for these collections of mask message data will vary as new collections of mask message data are received over time from the GEOs. Nonetheless, a full coordinate contour for groups of grid points containing delay correction messages, as well as those not containing delay correction message, can be dynamically determined by processing the 1's and 0's present in the mask bits of all the mask messages sent by a GEO.

According to the teachings of the present invention, a calculation is dynamically performed, using these received 1's and 0's in the mask messages, to determine an abbreviated bounding region for a given collection, or group of grid points having delay correction messages associated therewith. In one embodiment of the present invention, the dynamically calculated, abbreviated bounding region consists of three or more grid points each taken from the periphery of a given collection, or group of grid points containing delay correction messages, each of which has a respective latitudinal and longitudinal coordinate associated therewith. In one embodiment, the dynamically calculated, abbreviate bounding region consists of two coordinate data points which are then used to construct a rectangular, square, or box bounding region. In one embodiment, the dynamically calculated, abbreviated bounding region consists of a northeastern most grid point and a southwestern most grid point which can be used to determine a northwestern most grid point and a southeastern most grid point for a given collection, or group of grid points containing delay correction messages, which may be located across one or more bands.

As ionospheric grid point mask messages are received from the SBAS satellites actually being used by the receiver, they can be stored for later use in creating a rectangular bounding box, or abbreviated bounding region, that roughly approximates the grid points having delay correction messages associated therewith that are actually broadcast by a SBAS satellite. As stated above, in one embodiment the bounding box, or abbreviated bounding region, consists of a southwest corner latitude/longitude and a northeast corner latitude/longitude. The southwest corner latitude is determined by reviewing each mask grid point in the set of the ionospheric grid point mask messages transmitted by an SBAS satellite and setting the latitude to the southern most mask grid point latitude encountered. Similar processing is performed to set the southwest corner longitude to the western most mask grid point longitude encountered. An analogous process is performed for the northeast corner latitude/longitude.

It is noted that all of these determinations can be performed in one pass through the ionospheric grid point masks. Since the ionospheric grid point mask message contents can change over time, this review process can occur periodically to extend or shrink the bounding box, or abbreviated bounding region, as the same is termed herein. In the invention, this review can be triggered by a change in a received mask message issue of data indicator as compared to the previously stored mask message issue of data indicator. The issue of data indicator is a field in the ionospheric mask data structure, described below in connection with FIG. 9, which contains a value from 0 to 3.

Figure 8:
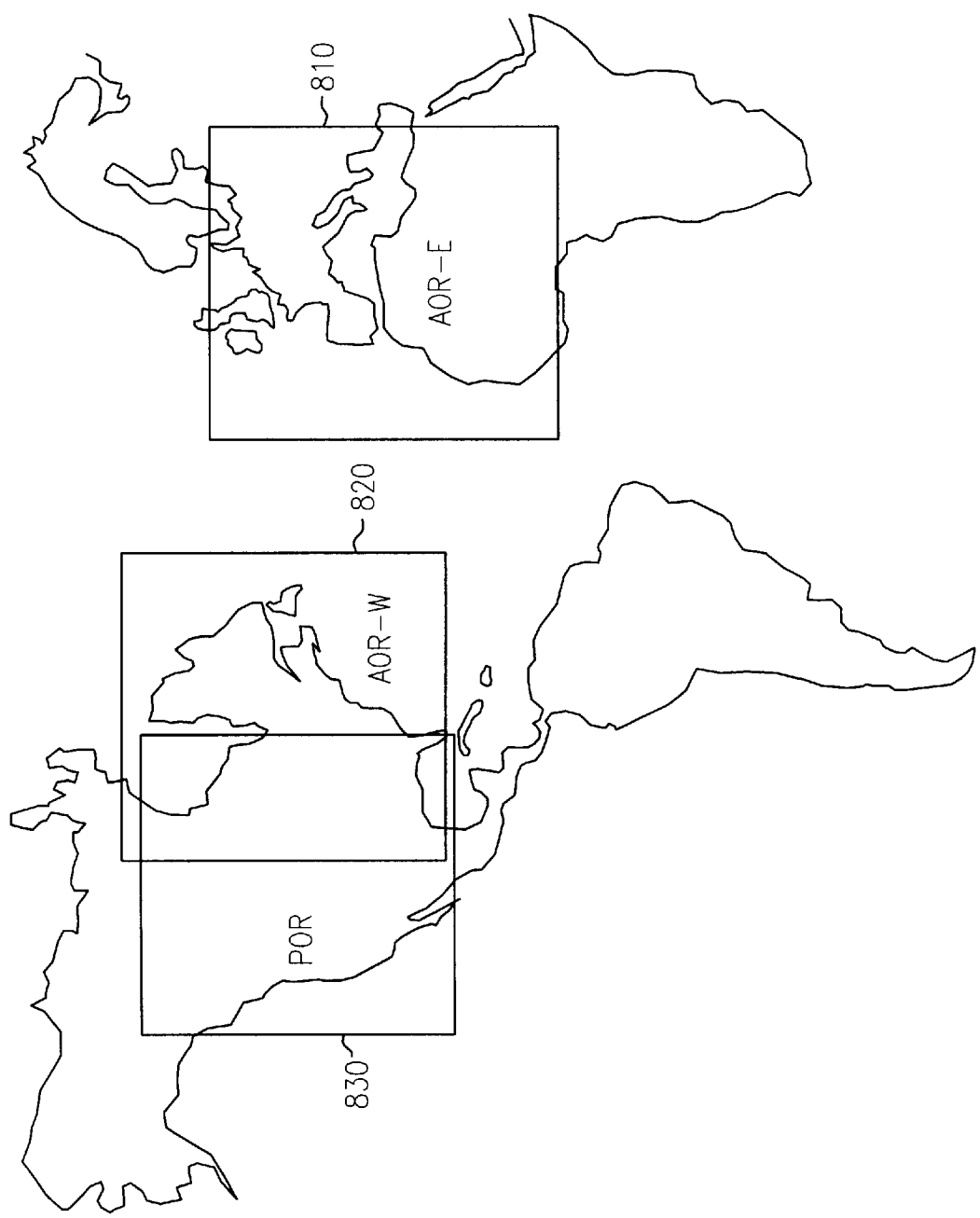
FIG. 8 illustrates a number of abbreviated bounding regions, which are dynamically determined or calculated according to the teachings of the present invention, encompassing a particular global area at a particular moment in time.

FIG. 8 illustrates a number of abbreviated bounding regions, which are dynamically determined or calculated as described above, encompassing a particular global area at a particular moment in time. In FIG. 8, three such abbreviated bounding regions are depicted as 810, 820, and 830. In the embodiment shown in FIG. 8, abbreviated bounding region 810 exemplifies an abbreviated bounding region, covering portions of Europe and North Africa, defined by two initial peripheral grid points, i.e. a northeastern most grid point and a southwestern most grid point, in a given collection, or group of grid points containing delay correction messages such as received from AOR-E (shown in FIG. 4). Abbreviated bounding region 820 exemplifies an abbreviated bounding region, covering portions of the Eastern United States, defined by two initial peripheral grid points, i.e. a northeastern most grid point and a southwestern most grid point, in a given collection, or group of grid points containing delay correction messages such as received from AOR-W (shown in FIG. 4). Abbreviated bounding region 830 exemplifies an abbreviated bounding region, covering portions of the Western United States, defined by two initial peripheral grid points, i.e. a northeastern most grid point and a southwestern most grid point, in a given collection, or group of grid points containing delay correction messages such as received from POR (shown in FIG. 4).

As one of ordinary skill in the art will understand upon reading this disclosure, an abbreviated bounding region can be dynamically calculated for a given collection, or group of grid points containing delay correction messages received from any number of GEOs. The invention is not so limited, and thus, in another embodiment of the present invention, more abbreviated bounding regions would be shown in FIG. 8 encompassing particular global areas at a particular moment in time.

Figure 9:
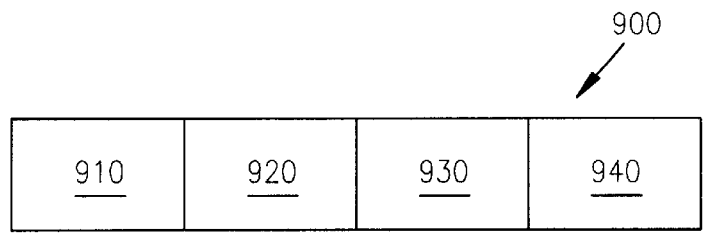
FIG. 9 is one embodiment of an ionospheric mask message data structure included in an SBAS transmission signal according to the teachings of the present invention.

FIG. 9 is one embodiment of an ionospheric mask data structure 900 representation for the SBAS transmission signal according to the teachings of the present invention. As one of ordinary skill in the art will understand upon reading this disclosure, the invention includes a set of such ionospheric mask data structures 900 with one structure per ionospheric mask transmitted by each SBAS GEO. In one embodiment, a maximum of eleven ionospheric masks can be sent per SBAS GEO corresponding to the 11 bands described in connection with FIG. 6. As shown in FIG. 9, the ionospheric mask data structure 900 includes the SBAS GEO's PRN, shown at block 910, which is used to identify the GEO from which the ionospheric mask was received. The ionospheric mask data structure 900 includes at block 920 an index of the band represented by the ionospheric mask. The ionospheric mask data structure 900 includes at block 930 an issue of data indicator, containing a value from 0 to 3, for the ionospheric mask. And further, the ionospheric mask data structure 900 includes at block 940 ionospheric mask bits. A maximum of 201 ionospheric mask bits are allowed, as described in connection with FIG. 6, with each bit representing a single grid point in a single ionospheric band.

The ionospheric mask bits provide an indication of whether a delay correction message is included for a particular grid point. That is, an ionospheric mask bit in block 940 is set to 1 if a delay correction message is included in the transmission signal for the grid point associated with that ionospheric mask bit. Conversely, an ionospheric mask bit in block 940 is set to 0 if a delay correction message is not included in the transmission signal for the grid point associated with that ionospheric mask bit. Each of the mask grid points has an assigned latitude and longitude known to the receiver. In some embodiments, the assigned latitude and longitude are stored in the receiver's memory. The latitude and longitude for the grid point associated with an ionospheric mask bit can be derived by utilizing a given ionospheric mask bit in block 940 with the index of band indicator in block 920.

As one of ordinary skill in the art will understand upon reading this disclosure, the amount of data contained in the ionospheric mask data structure 900 can be less voluminous than the amount of data which is contained in the delay correction message portion of an SBAS transmission signal. Thus, by first analyzing the ionospheric mask data structure and using the same to construct an abbreviated bounding region to determine a best SBAS correction source, memory and processor resources in the receiver are conserved.

As one of ordinary skill in the art will appreciate upon reading and understanding this disclosure, a GPS device, such as GPS device 510 shown in FIG. 5, can be adapted to store and process the ionospheric mask data structure 900 shown in FIG. 9. The GPS device operates on ionospheric mask data structure 900 to construct an abbreviated bounding region, or bounding box for each SBAS satellite being tracked. As described in more detail below, the GPS device then compares its non-SBAS corrected position and/or corrected position to determine which is the preferred SBAS correction satellite from among the SBAS satellites that are being tracked by the GPS device. This alleviates the problem of storing and processing less meaningful delay correction messages. As described above, storing and processing all of the delay correction messages from each SBAS satellite being tracked can tax the GPS device's processor and memory resources. And, as mentioned above, much of the processor time and memory space required to do so is wasted in situations of WAAS signal overlap because only the ionospheric grid point correction elements provided by a correction source within a certain distance of a GPS receiver's current location are relevant or accurate enough to improve the precision of the GPS service by providing true ionospheric condition corrections at that location.

Figure 10:
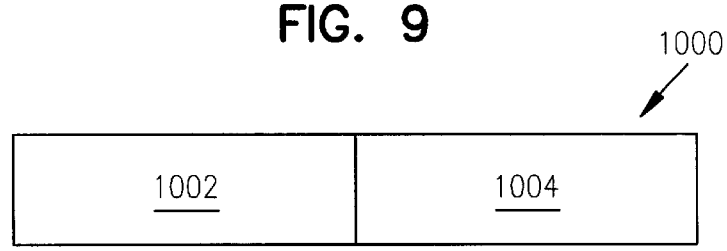
FIG. 10 is one embodiment of an abbreviated grid boundary data structure according to the teachings of the present invention.

FIG. 10 is one embodiment of an abbreviated grid boundary data structure 1000 according to the teachings of the present invention. A set of such abbreviated grid boundary data structures 1000 can be created or derived from the ionospheric mask data structures in FIG. 9 with one abbreviated grid boundary data structure so derived per SBAS GEO being tracked by the GPS device. As noted above, the abbreviated grid boundary data structure 1000 is used by a GPS device in selecting the preferred SBAS correction satellite. Such a data structure 1000 is capable of being found in volatile or nonvolatile memory of the GPS receiver device and as a signal in various communication media.

The GPS receiver device uses the abbreviated grid boundary data structure 1000 to determine whether to continue receiving, storing and/or processing correction messages from a currently selected SBAS satellite, or to select another SBAS satellite from which to receive the correction messages.

As shown in FIG. 10, an abbreviated grid boundary data structure includes at block 1002 the SBAS GEO's PRN used to identify the GEO from which the abbreviated boundary was determined. In the embodiment of FIG. 10, the abbreviated grid boundary data structure includes at block 1004 the periphery points of the abbreviated grid boundary data structure. As described above, in one embodiment, the periphery points in block 1004 include a southwest corner latitude and longitude containing the southernmost latitude and westernmost longitude of grid points having delay correction messages associated therewith as contained in the set of ionospheric mask messages transmitted by the SBAS GEO identified by block 1002. Likewise, in one embodiment, the periphery points in block 1004 includes a northeast corner latitude and longitude containing the northernmost latitude and easternmost longitude of grid points having delay correction messages associated therewith as contained in the set of ionospheric mask messages transmitted by the SBAS GEO identified by block 1002. As one of ordinary skill in the art will understand upon reading this disclosure, a computed position, or location of a GPS device receiving the SBAS satellite signals can be compared to the abbreviated grid boundary data structure 1000 to determine a proximity of the location of the GPS device to an abbreviated bounding region represented by the abbreviated grid boundary data structure and/or whether the location of the GPS device in within the abbreviated bounding region so defined. As one of ordinary skill in the art will understand upon reading this disclosure, the computed position of the GPS device receiving the SBAS satellite signals can include SBAS corrected and/or non-SBAS corrected GPS position data.

As one of ordinary skill in the art will understand upon reading and understanding the present disclosure, the processor in the GPS device operates on the set of abbreviated grid boundary data structures to select a preferred SBAS correction satellite.

The present invention uses less processor resources and time, and uses less memory since a determination can be made quickly by the GPS device as to whether it should continue receiving, storing and/or processing correction messages from a currently selected SBAS satellite, or to select another SBAS satellite from which to receive the correction messages. Additionally, the present invention uses less processor resources and time, and uses less memory since the same are not wasted operating on delay correction messages from a given SBAS satellite where those delay correction messages are less relevant or accurate for the current location of the GPS device. Thus, the present invention improves the precision of the GPS service by providing true ionospheric condition corrections, or other correction data, for any given location of a GPS device, and particularly so in situations of WAAS signal overlap (as shown in FIG. 4).

Figure 11:
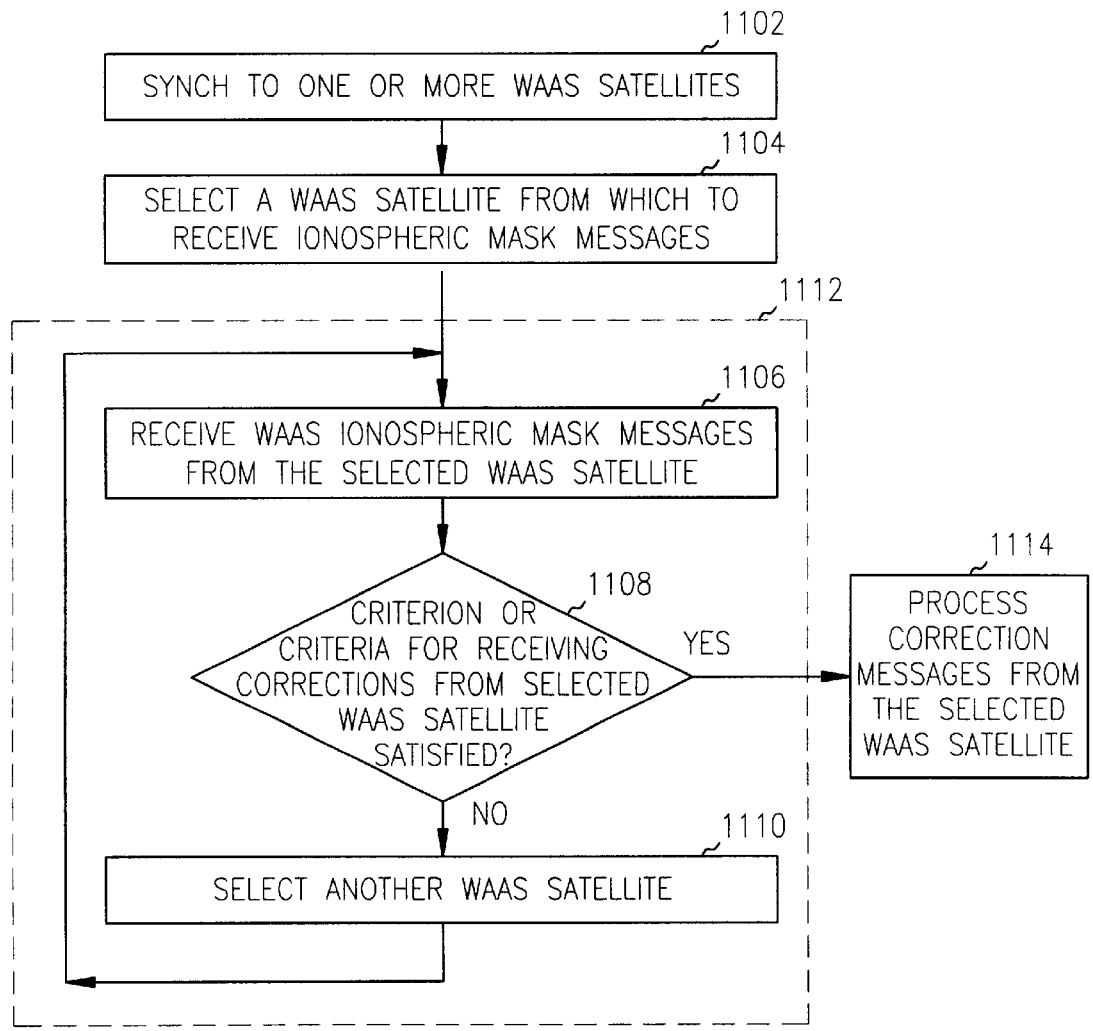
FIG. 11 is a flow diagram illustrating one method embodiment according to the present invention.

FIG. 11 is a flow diagram illustrating one method embodiment according to the present invention. A GPS receiver device such as shown in FIG. 5, for example, synchronizes to signals from one or more WAAS satellites at 1102. One of ordinary skill in the art will understand, upon reading and comprehending this disclosure, that other SBAS satellites such as EGNOS and MSAS satellites may be used in place of the WAAS satellites. Proceeding to 1104, a WAAS satellite is selected as the satellite from which to receive ionospheric mask messages, or signals. For example, according to one embodiment, the first WAAS satellite that is synchronized is selected as the initial satellite from which to receive ionospheric mask messages.

Proceeding to 1106, the method includes receiving WAAS ionospheric mask messages from the selected WAAS satellite. As one of ordinary skill in the art will understand upon reading this disclosure, a WAAS ionospheric mask data structure, or set of ionospheric mask data structures with one structure per ionospheric mask message transmitted by each WAAS satellite (maximum of 11 per WAAS satellite), is created from the received WAAS ionospheric mask messages. At 1108, it is determined whether criterion, or criteria, for receiving correction data, or messages from the selected WAAS satellite is satisfied as described further below. Upon determining that the criterion/criteria is satisfied, the process proceeds to block 1114 and continues with processing WAAS correction messages received from the selected WAAS satellite. Upon determining that the criterion is not satisfied, the process proceeds to 1110 where another WAAS satellite is selected and the selection criteria analyzed. The sequence outlined and grouped within 1112 is repeated until the selection criteria for receiving and processing correction messages from a preferred WAAS correction satellite are met and prior to proceeding to block 1114 to continue with receiving and processing WAAS correction messages from the preferred WAAS correction satellite.

Figure 12:
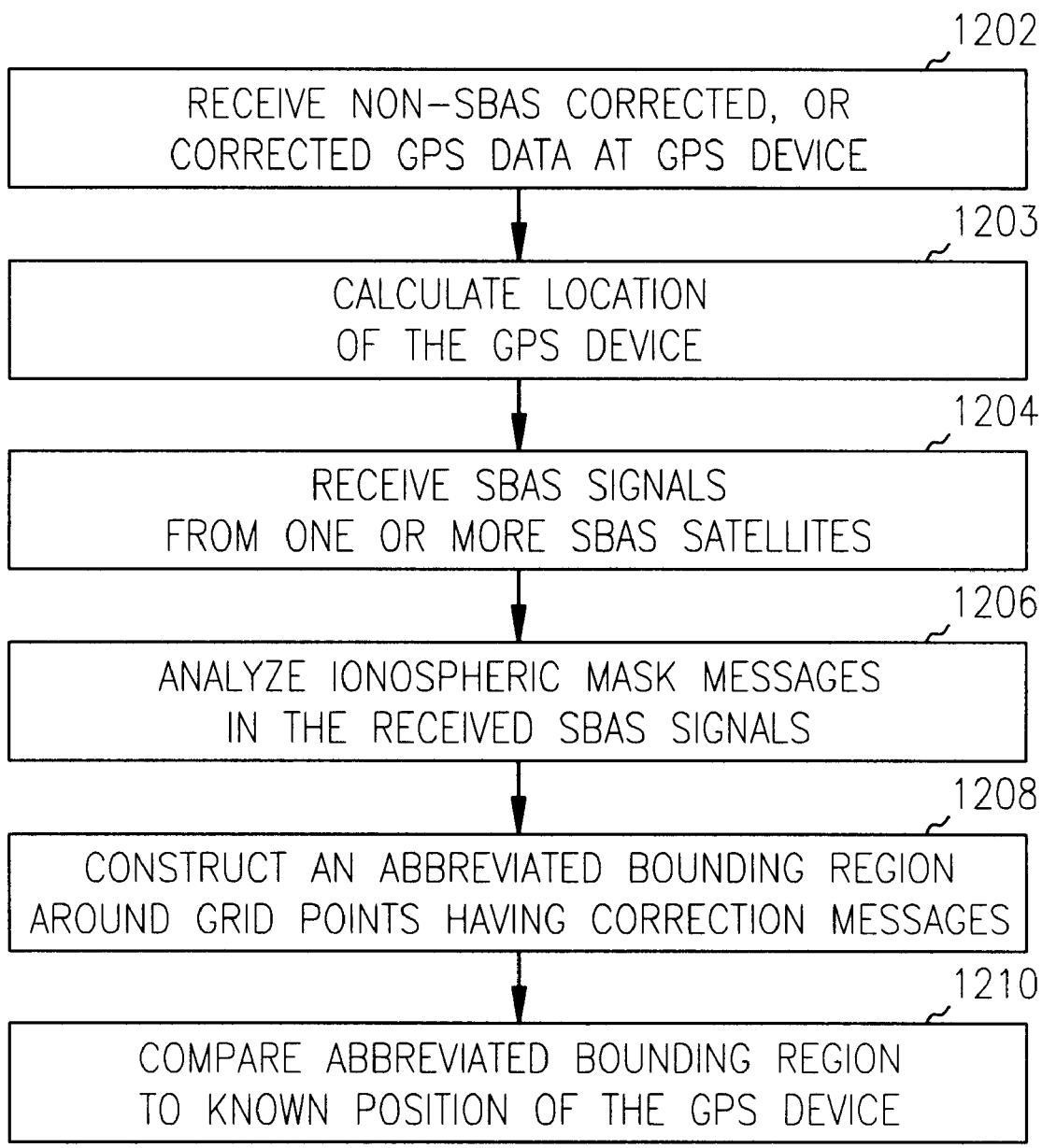
FIG. 12 is a flow diagram illustrating another method embodiment according to the present invention.

FIG. 12 is a flow diagram illustrating another method embodiment according to the present invention. In block 1202 a GPS receiver device such as shown in FIG. 5, receives non-SBAS corrected and/or corrected GPS signals or data at a given GPS device location. In block 1203, the GPS receiver device calculates, or computes, its location. In block 1204 a GPS receiver device receives SBAS signals from one or more SBAS satellites. According to the teachings of the present invention, receiving the non-SBAS corrected and/or corrected GPS signals or data, calculating a location of the GPS device, and receiving the SBAS signals do not have to occur in a particular order and can in some embodiments be received simultaneously.

Proceeding to 1206, the GPS device analyzes ionospheric mask messages, for a number of ionospheric bands, in the received SBAS signals. Each ionospheric mask message pertains to a single ionospheric band (a maximum of 11 per GEO), as described in connection with FIG. 6. As one of ordinary skill in the art will understand upon reading this disclosure, a set of ionospheric mask data structures with one structure per ionospheric mask message transmitted by each SBAS GEO will be received. As described above, each ionospheric mask data structure, created from the received WAAS ionospheric mask messages, will include the SBAS GEO's PRN used to identify the GEO from which the ionospheric mask message was received. Each ionospheric mask data structure, created from the received WAAS ionospheric mask messages, will further include an index of the band represented by the ionospheric mask message, an issue of data indicator for the ionospheric mask message, and space for the ionospheric mask bits (201 bits maximum) with each bit representing, e.g. set to a 1 or 0, whether delay correction data is being transmitted for the single grid point in a single ionospheric band associated with that particular ionospheric mask bit. The set of ionospheric mask data structures can be temporarily stored in the memory of the GPS device 510 without exhausting the memory by storing all of the SBAS signal data, e.g. the delay correction message data itself.

In block 1208, the GPS device constructs an abbreviated bounding region around grid points having correction messages, or delay correction data associated therewith. The dynamically calculated abbreviated bounding region, or bounding box can be temporarily stored in the memory of the GPS device along with the non-SBAS corrected and/or corrected position of the GPS device. However, in some embodiments, the non-SBAS corrected and/or corrected position of the GPS device is stored separately in the memory of the GPS device.

In block 1210, the GPS device compares the abbreviated bounding region to known, non-SBAS corrected position and/or corrected position of the GPS device. In one embodiment, if the known, non-SBAS corrected position and/or corrected position of the GPS device is within the abbreviated bounding region, then the GPS device continues receiving, storing and/or processing correction messages from that particular SBAS satellite. However, if the non-SBAS corrected position and/or corrected position of the GPS device is not within the abbreviated bounding region, then the GPS device discontinues receiving, storing and/or processing correction messages from that particular SBAS satellite and the GPS device looks for another SBAS satellite to select as a SBAS correction source.

As shown in FIG. 8, portions of the abbreviated bounding regions may overlap at particular times depending on the dynamic ionospheric mask message data received by a GPS receiver for any position of a GPS device 510. However, as identified in the background section, the accuracy, desirability and/or equivalency of SBAS correction messages are not necessarily the same for the various SBAS correction sources.

According to the teachings of the present invention, when the GPS device receives transmission signals from multiple SBAS satellites it can sequentially construct an abbreviated bounding region representative of the multiple SBAS transmission signals received from the multiple SBAS satellites. The GPS device 510 can ignore those correction message transmissions from a given GEO when the GPS device's known, non-differentially corrected position and/or corrected position do not fall within the abbreviated bounding region and can continue comparing its known, non-differentially corrected position and/or corrected position with subsequent abbreviated bounding regions constructed from the continual scanning and reception of SBAS signal transmissions from one or more GEOs.

In some instances, however, the GPS receiver in the GPS device receives transmission signals from multiple SBAS satellites and sequentially determines that its known, non-differentially corrected position and/or corrected position falls within an abbreviated bounding region for each respectively or, alternatively, that its known, non-differentially corrected position and/or corrected position does not fall within an abbreviated bounding region for either respectively. In these instances, according to the teachings of the present invention, the GPS device 510 will use a set of processing algorithms, described and explained in more detail below, to determine from which of the GEOs it should continue receiving, storing and processing correction messages.

Figure 13:
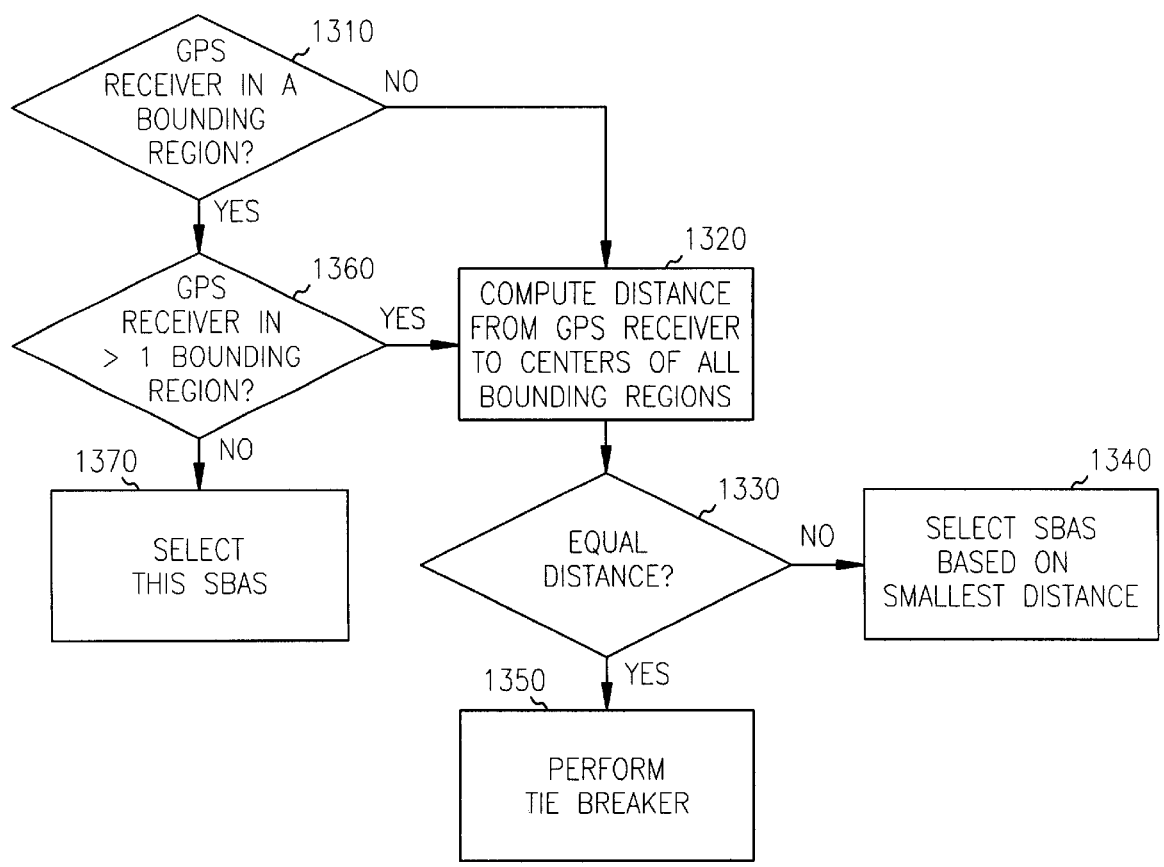
FIG. 13 is a flow diagram illustrating one processing algorithm for determining from which GEO a GPS device should continue to receive, store, and/or process correction messages.

FIG. 13 is a flow diagram illustrating one processing algorithm for determining from which GEO a GPS device, e.g. 510, should continue to receive, store, and/or process correction messages. As stated above, multiple SBAS satellites can be acquired by a given GPS/SBAS receiver unit, when they are visible. The bounding box, or abbreviated bounding region, and the receiver's position can be used to determine which of the visible SBAS satellites should be the preferred source of corrections. A hierarchy of comparison is performed to determine which SBAS satellite should be the preferred SBAS correction satellite. In the embodiment of FIG. 13, the method includes determining in block 1310 if a GPS device's receiver is located within an abbreviated bounding region or bounding box, as the same has been described herein. If the receiver's position is not inside the bounding box of any of the tracked SBAS satellites, then the method proceeds to block 1320. In block 1320, the preferred SBAS correction satellite is determined by computing a distance from the receiver's position to the centers of all the bounding boxes associated with the SBAS satellites that are being tracked. In block 1330, the method includes determining whether any of the computed distances are equal. If none of the computed distances are equal, then the method proceeds to block 1340 and the smallest distance from the GPS receiver to the center of the various bounding boxes associated with the SBAS satellites that are being tracked is used to select which of the SBAS satellites that are being tracked is the preferred SBAS correction satellite.

In the event that the distance from the GPS receiver to the center of two or more of the bounding boxes is the same, then the method continues to block 1350. In block 1350 a tie-breaking algorithm is performed. For example, in one embodiment, the tie-breaking algorithm determines the number of ionospheric grid points that are available within the ionospheric grid boundaries as computed by the invention described in a co-pending application by the same inventors, assigned to the same entity, having Ser. No. 10/382,976 and entitled "Method and System for Minimizing Storage and Processing of Ionospheric Grid Point Correction Information." The same, as stated above, is incorporated in full herein by specific reference. In this embodiment, the SBAS satellite with the most ionospheric grid points within the ionospheric grid boundaries is selected as the preferred SBAS correction satellite.

Returning to block 1310, if the receiver's position is inside the bounding box of any of the tracked SBAS satellites, then the method proceeds to block 1360. In block 1360, the method includes determining whether the receiver is in more than one bounding box. As shown in the embodiment of FIG. 13, if the receiver's position is located inside only one of the bounding boxes of the tracked SBAS satellites, then the method proceeds to block 1370. In block 1370, the SBAS correction satellite associated with the single bounding box in whose bounding box the GPS device's receiver lies inside is selected as the preferred SBAS correction satellite.

Returning to block 1360, if the receiver's position is inside more than one of the bounding boxes of the tracked SBAS satellites, then the method proceeds to block 1320 and follows the sequence described above in connection with blocks 1320 through blocks 1350.

Since the GPS/SBAS receiver position changes over time, this hierarchy of comparisons can be performed periodically. Since the position changes relatively slowly, this hierarchy of comparisons can be made at a slow rate (e.g., once per minute) and still meet the system dynamics associated with a changing GPS/SBAS receiver position.

In this manner a best SBAS correction source satellite is quickly and efficiently determined and selected for any given GPS device location. By processing only the delay correction message(s) from a best SBAS correction source satellite, the resources of the GPS device are conserved. And further in the invention, the GPS device uses only the most relevant and accurate delay correction messages for the current location of the GPS device, thus improving the precision of the GPS service. As evident from this disclosure, the invention is particularly useful in situations of WAAS signal overlap (as shown in FIG. 4).

One of ordinary skill in the art will understand upon reading and understanding this disclosure, that numerous additional techniques are additionally employed for operating on the SBAS correction message(s) from a preferred WAAS correction source satellite. Standards for the WAAS system and its operation are described in more detail in several versions of documents entitled; "Wide Area Augmentation System (WAAS)," FAA-E-2892B, Change 2, and "Minimum Operational Performance Standards for Global Positioning System/Wide Area Augmentation System Airborne Equipment," RTCA/DO-229, 229A, 229B, and 229C. These documents are incorporated in the present application by specific reference.

Such grid point correction data from a preferred correction source SBAS satellite are stored in the GPS device 510 and analyzed. One particular advantageous approach for operating on correction data is described in Applicants' copending, commonly assigned, U.S. patent applications entitled "Method and System for Minimizing Storage and Processing of Ionospheric Grid Point Correction Information," Ser. No. 10/382,976, which is incorporated herein by reference.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured in an object-orientation using an object-oriented language such as Java, Smalltalk or C++, and the programs can be structured in a procedural-orientation using a procedural language such as COBOL or C. The software components communicate in any of a number of methods that are well-known to those skilled in the art. However, as will be appreciated by one of ordinary skill in the art upon reading this disclosure, the teachings of the present invention are not limited to a particular programming language or environment.

CONCLUSION

The above systems, devices and methods have been described, by way of example and not by way of limitation, with respect to improving SBAS-corrected GPS service. Specifically, the present invention provides a GPS device with the correction messages which are from the most accurate and desirable source while at the same time conserving processor and memory resources of the device.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A method for determining a corrections source in a space based augmentation system (SBAS) for use by a global positioning system (GPS) device, comprising:
   receiving GPS data;
   receiving an SBAS signal from a first correction source, the SBAS signal containing a number of ionospheric mask messages, each ionospheric mask message including a number of ionospheric mask bits with each bit representing a single grid point in a single ionospheric band;
   analyzing the ionospheric mask messages; and
   constructing an abbreviated bounding region around a group of similar type grid points.

2. The method of claim 1, wherein receiving GPS data includes receiving non-differentially corrected GPS data from a GPS satellite.

3. The method of claim 1, wherein the method further includes storing the ionospheric mask message data in a memory of the GPS device.

4. The method of claim 1, wherein analyzing the ionospheric mask messages includes analyzing ionospheric mask bits of each ionospheric mask message to determine whether each ionospheric mask bit is set to a 1 or a 0.

5. The method of claim 1, wherein constructing an abbreviated bounding region around a group of similar type of grid points includes constructing an abbreviated bounding region around a type of grid points having an ionospheric delay correction associated therewith.

6. The method of claim 5, wherein constructing an abbreviated bounding region around a group of similar type of grid points includes constructing an abbreviated bounding region using a southwest corner latitude and longitude containing a southernmost latitude and a westernmost longitude derived from the ionospheric mask messages and using a northeast corner latitude and longitude containing a northernmost latitude and an easternmost longitude derived from the ionospheric mask messages.

7. A method for determining a corrections source in a space based augmentation system (SBAS), comprising:
   receiving ionospheric mask messages from a first GEO satellite;
   dynamically analyzing the ionospheric mask messages to determine a first abbreviated bounding region for a group of ionospheric grid points;
   determining a position of the GPS device; and
   determining whether the position of the GPS device is within the first abbreviated bounding region.

8. The method of claim 7, wherein the method further includes:
   receiving ionospheric mask messages from a second GEO satellite;
   dynamically analyzing the ionospheric mask messages to construct a second abbreviated bounding region for a group of ionospheric grid points; and
   determining whether the position of the GPS device is within the second abbreviated bounding region.

9. The method of claim 8, wherein the method is performed in the order listed.

10. The method of claim 8, wherein the method further includes storing an identifier received from the first and the second GEOs.

11. The method of claim 8, wherein, when the GPS device is within only a single abbreviated bounding region constructed from two or more GEOs, processing SBAS correction messages received from the GEO satellite associated with the single abbreviated bounding region which encompasses the position of the GPS device.

12. The method of claim 8, wherein, when the GPS device is within one or more abbreviated bounding regions constructed from two or more GEOs, performing an analysis of which abbreviated bounding region more fully encompasses the position of the GPS device and processing SBAS correction messages received from the GEO satellite associated with that abbreviated bounding region which most fully encompasses the position of the GPS device.

13. The method of claim 8, wherein, when the GPS device is not within one or more abbreviated bounding regions constructed from two or more GEOs, computing a distance from the position of the GPS device to a center of all the abbreviated bounding regions and processing SBAS correction messages received from the GEO satellite associated with an abbreviated bounding region whose center is a shortest distance from the position of the GPS device.

14. The method of claim 8, wherein dynamically analyzing the ionospheric mask messages to determine each abbreviated bounding region includes using a northeastern most grid point, and a southwestern most grid point, containing a group of ionospheric grid points having delay correction messages associated therewith, which may be located across one or more bands of ionospheric grid points.

15. A computer-readable medium having computer-executable instructions adapted to:
   receive GPS data;
   receive an SBAS signal from a first correction source, the SBAS signal containing a number of ionospheric mask messages, each ionospheric mask message including a number of ionospheric mask bits with each bit representing a single ionospheric grid point in a single ionospheric band;
   analyze the ionospheric mask messages; and
   construct an abbreviated bounding region around a group of similar type ionospheric grid points.

16. The computer-readable medium of claim 15, wherein the computer-executable instructions adapted to receive GPS data include computer-executable instructions adapted to receive non-differentially corrected GPS data from a GPS satellite.

17. The computer-readable medium of claim 15, wherein the computer-executable instructions adapted to receive an SBAS signal further include computer-executable instructions adapted to store the ionospheric mask messages in a memory of the GPS device.

18. The computer-readable medium of claim 15, wherein the computer-executable instructions adapted to analyze ionospheric mask messages include computer-executable instructions adapted to analyze each ionospheric mask bit for a 1 or a 0 bit.

19. The computer-readable medium of claim 15, wherein the computer-executable instructions adapted to construct an abbreviated bounding region around a group of similar type of ionospheric grid points include computer-executable instructions adapted to construct an abbreviated bounding region around a type of ionospheric grid points having an SBAS correction message associated therewith.

20. The computer-readable medium of claim 15, wherein the computer-executable instructions adapted to construct an abbreviated bounding region around a group of similar type ionospheric grid points include computer-executable instructions adapted to construct an abbreviated bounding region using a southwest corner latitude and longitude containing a southernmost latitude and a westernmost longitude derived from the ionospheric mask messages and using a northeast corner latitude and longitude containing a northernmost latitude and an easternmost longitude derived from the ionospheric mask messages.

21. The computer-readable medium of claim 15, wherein the computer-executable instructions further include computer-executable instructions adapted to process SBAS correction messages received from the first correction source when a position of a GPS device is within the abbreviated bounding region.

22. A data structure for use by a global positioning system (GPS) device in making space based augmentation system (SBAS) corrections, comprising:
   a field representing an SBAS satellite identity; and
   a field representing an abbreviated bounding region around a group of similar type grid points in an SBAS signal; wherein the field representing the abbreviated bounding region is derived from a number of ionospheric mask messages, each ionospheric mask message having a data structure including:
      a field representing an SBAS satellite identity;
      a field representing an index of band;
      a field representing an issue of data indicator; and
      a field containing a number of ionospheric mask bits with each mask bit representing a single grid point in a single ionospheric band, and each mask bit indicating whether SBAS correction data is being provided by the SBAS satellite identity for that grid point.

23. The data structure of claim 22, wherein the field representing an abbreviated bounding region includes a field for an abbreviated bounding region consisting of at least two periphery coordinate data points around a group of grid points having SBAS correction messages associated therewith.

24. A Global Positioning System (GPS) device, comprising:
   a processor;
   a memory adapted to communicate to the processor;
   a GPS receiver adapted to receive GPS signals and Space Based Augmentation System (SBAS) signals including a number of ionospheric mask messages; and
   wherein the device is operable to dynamically construct an abbreviated bounding region around a group of similar type grid points contained in the number of ionospheric mask messages.

25. The device of claim 24, wherein the device is further operable to determine whether a location of the GPS device is within the abbreviated bounding region.

26. The device of claim 24, wherein the GPS device includes a portable GPS receiver device.

27. The device of claim 24, wherein the GPS device includes a personal digital assistant (PDA).

28. The device of claim 24, wherein the GPS device includes a wireless communication device.

* * * * *